Nov. 25, 1969 S. KARPCHUK 3,479,885
HIGH SPEED BALANCING MACHINE
Filed Aug. 2, 1967 3 Sheets-Sheet 1
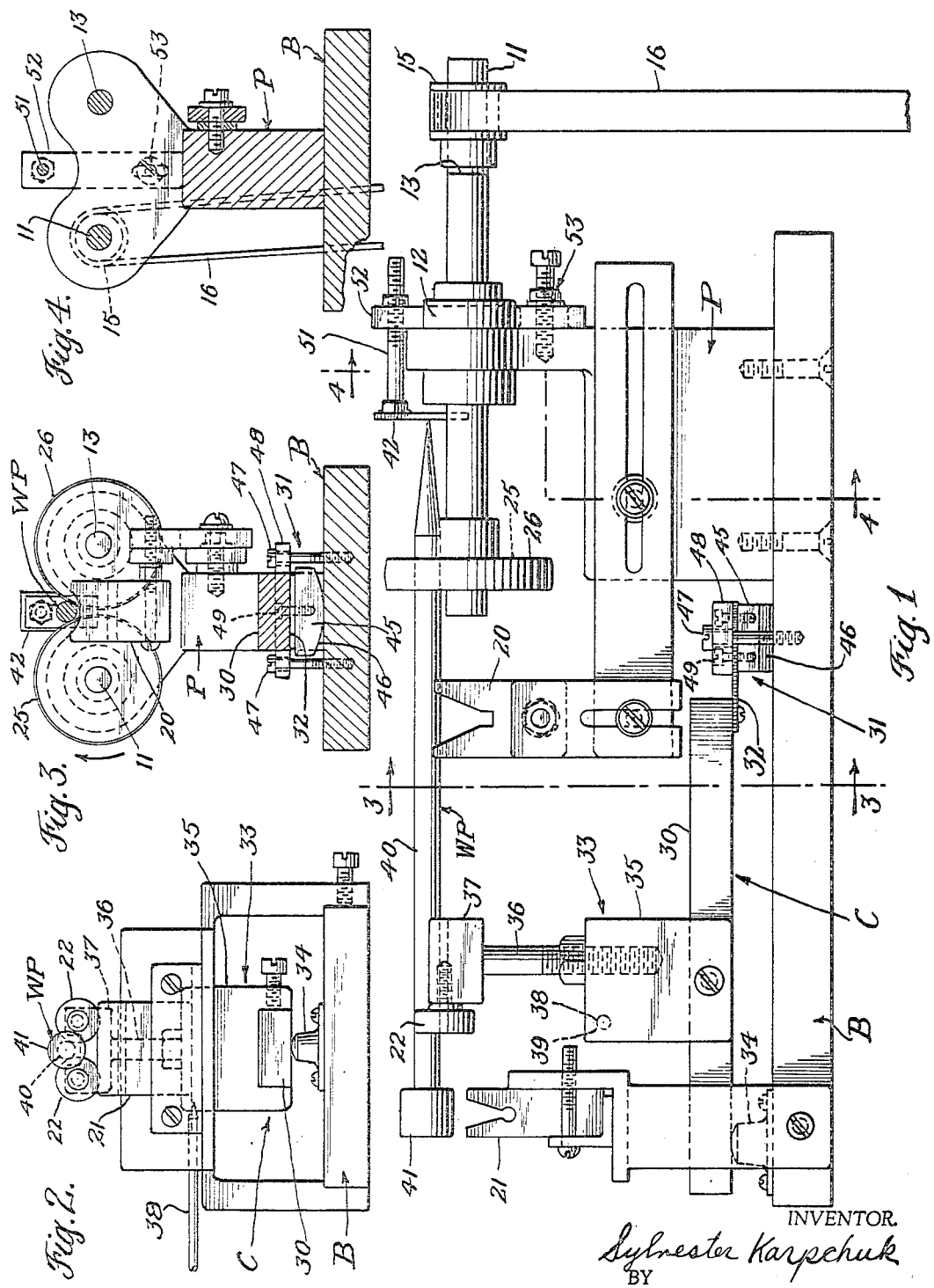
INVENTOR.
Sylvester Karpchuk
BY
Synnestvedt & Lechner
ATTORNEYS

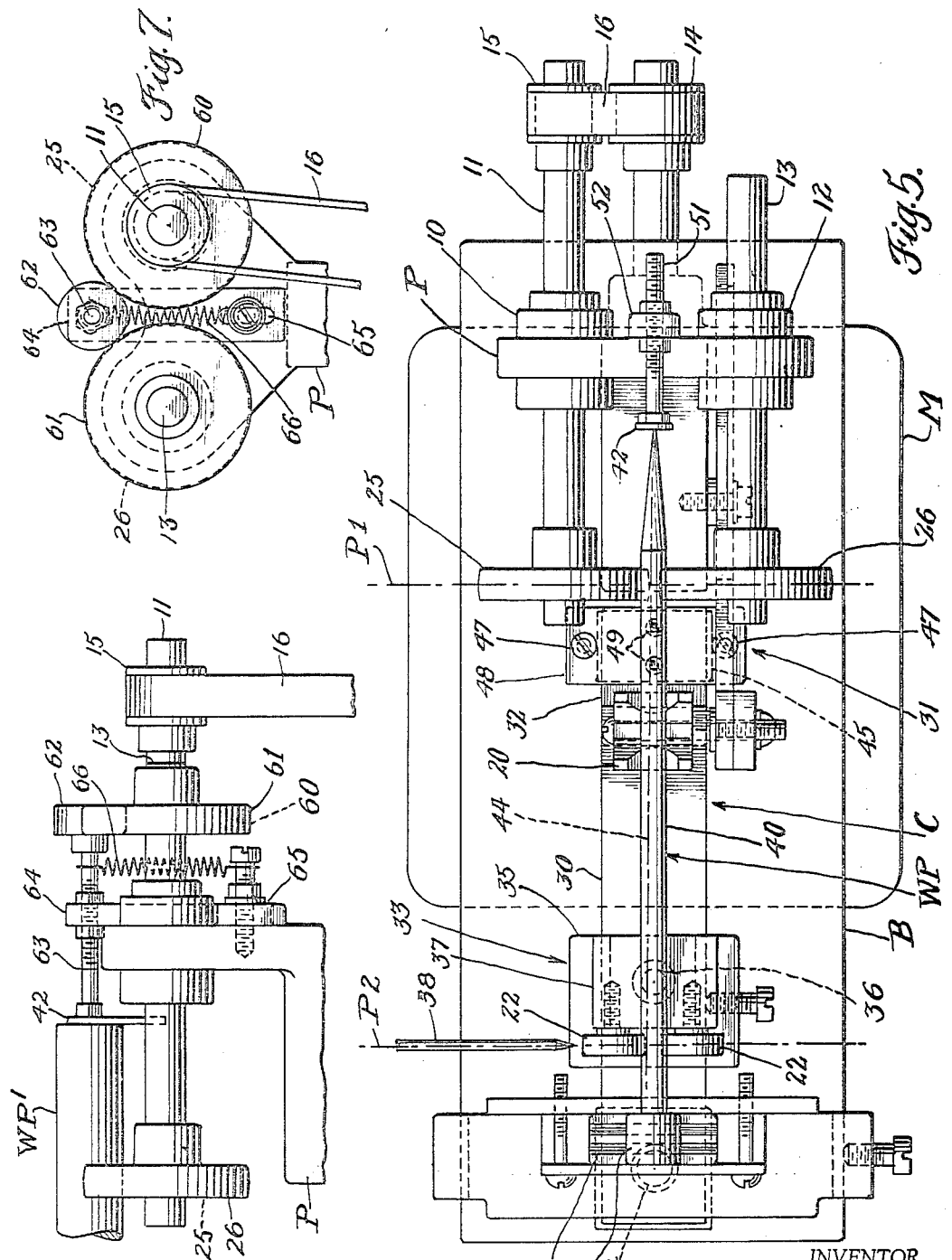

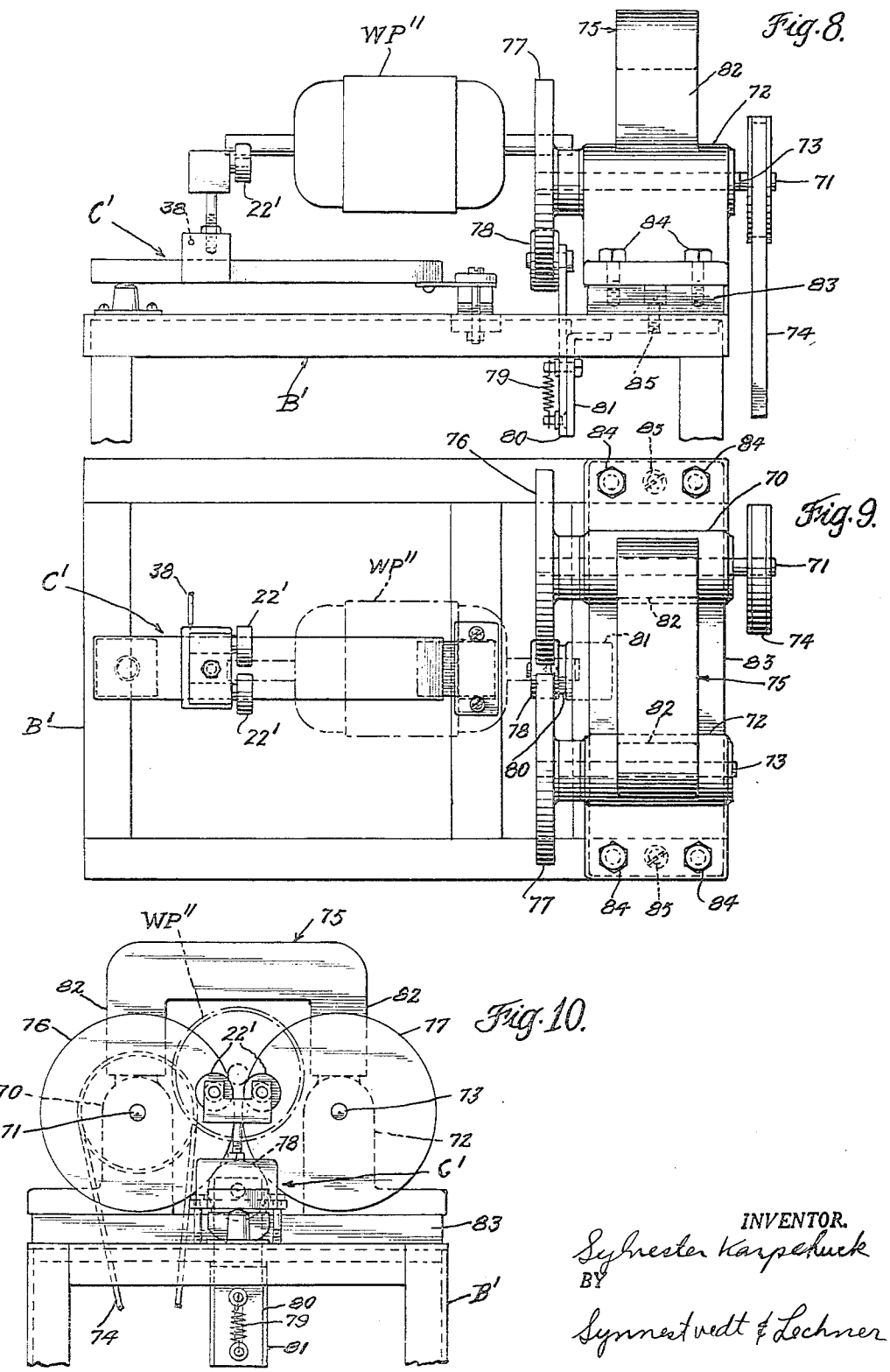

United States Patent Office 3,479,885
Patented Nov. 25, 1969

3,479,885
HIGH SPEED BALANCING MACHINE
Sylvester Karpchuk, Philadelphia, Pa., assignor to Tinius Olsen Testing Machine Company, Willow Grove, Pa., a corporation of Pennsylvania
Filed Aug. 2, 1967, Ser. No. 657,878
Int. Cl. G01m 1/16
U.S. Cl. 73—460            8 Claims

ABSTRACT OF THE DISCLOSURE

High speed equipment for determining the unbalance in a work piece having a composite cradle and drive system for supporting and rotating a work piece at extremely high speeds and means to hold the work piece in the cradle and drive as it rotates at high speed.

---

This invention relates to equipment for use in determining unbalance in work pieces rotating at extremely high speeds, for example at speeds as high as 300,000 r.p.m.

The principle objectives of the invention are to provide a composite cradle and drive means adapted for high speed balancing of work pieces and mechanism to maintain such work pieces axially and radially immoveable while rotating at high speed.

In one aspect the invention contemplates a balancing machine wherein the part of the work piece where the unbalance is to be determined is rotatably supported on a vibratory cradle and another part of the work piece is supported on drive means to be rotated thereby but with freedom to pivot about the drive means and thereby vibrate with the cradle.

In another aspect the invention contemplates a balancing machine wherein the part of the work piece where the unbalance is to be determined is rotatably supported on a vibratory cradle and another part of the work piece is supported on drive means to be rotated thereby but with freedom to pivot about the drive means and thereby vibrate with the cradle, the cradle being oriented with respect to the drive so that rotation of the drive causes the workpiece to move axially and contact an abutment and thereby maintain its axial position.

In a further aspect the invention contemplates a balancing machine having magnetic means to maintain a high speed workpiece against both radial and axial movement while the same is being tested for unbalance on a vibratory cradle.

In another aspect the invention contemplates a balancing machine having an annular piece or band of magnetic material on a workpiece and a magnet to induce poles in the material and thereby develop forces to hold the workpiece against axial movement while the same is being tested for unbalance on a vibratory cradle.

In another aspect the invention contemplates a balancing machine wherein the shaft of a workpiece is supported on drive rollers, the drive rollers and shaft being part of a magnetic circuit which increases the driving efficiency and permits balancing speeds to be obtained very quickly.

The invention will be described below in connection with the drawings wherein:

FIGURE 1 is a side elevational view of a machine constructed in accordance with the invention with one form of workpiece shown in place;

FIGURE 2 is an end view, on a slightly reduced scale as viewed from the left in FIGURE 1;

FIGURE 3 is a cross section on the line 3—3 of FIGURE 1;

FIGURE 4 is a cross section on the line 4—4 of FIGURE 1;

FIGURE 5 is a plan view of FIGURE 1;

FIGURE 6 is a fragmentary elevational view of a modified drive arrangement for the workpiece;

FIGURE 7 is an end view of the drive of FIGURE 6 as viewed from the right;

FIGURE 8 is a side elevational view of a modified balancing machine; and

FIGURES 9 and 10 are plan and end views respectively of the machine in FIGURE 8.

Referring particularly to FIGURES 1 and 5, the machine has a base plate B; supporting pedestal P carrying a bearing 10 for the drive spindle 11 and a bearing 12 for the idler; spindle 13; a drive motor M (FIGURE 5) for driving the drive spindle 11 by means of pulleys 14, 15, and belt 16; vibrating cradle structure indicated as a whole by the letter C; a work piece WP; a magnet 20 supported from the pedestal P and a magnet 21 carried by the base plate B. The poles of magnet 21 are spaced in a direction along the axis of the work piece.

The drive spindle 11 has a drive roll 25 secured thereon and the idler or driven spindle 13 has an idler or driver roll 26 secured thereon, which rolls are preferably crowned as shown and as seen in FIGURES 3 and 5 they are mounted in the pedestal P in laterally spaced relation. By referring to FIGURE 3 it will be seen that the work piece WP seats on the rolls 25 and 26 of the drive and on rolls 22 of the cradle C.

The cradle C has a longitudinally extending bar 30 secured at one end to base structure 31 mounted on the base plate B by means of a leaf spring 32 and a work piece support 33 mounted toward the free end of the cradle bar 30. Adjacent its free end the cradle bar 30 bears on a resilient abutment 34 of rubber or the like secured on the base plate B. The purpose of the abutment is to hold up the bar 30 but leave it free to tilt about a generally horizontal axis, the purpose of which will be explained later.

The work piece support 33 comprises a base block 35 secured on the cradle bar 30 carrying an upright stud 36 having a head 37. Mounted in the head are laterally spaced rollers 22. Bearing against the side of the base block 35 is the point of a pick-up rod 38 (FIGURES 1, 2 and 5), it being noted from FIGURE 1 that this pick-up rod 38 preferably contacts the base block 35 at a point 39.

The magnet 20 above referred to is located at a point intermediate of the ends of the work piece and the downward pull of the magnet 20 not only prevents the work piece from moving radially or jumping off the rolls 22, 25, 26 but keeps the work piece in firm driving contact with the rolls 25 and 26.

The particular work piece WP illustrated has a shank portion 40 and an enlarged head portion 41. In this instance the magnet 21 above referred to is located under the head portion 41 which is made of magnetizeable material. The poles of the magnet and the poles induced in the corners of the head function to provide coupling forces which prevent the work piece from moving axially. When the magnet 21 is used to hold the work piece axially the stop or abutment 42 is removed. The purpose of the stop or abutment is explained later.

While the head 41 is integral with the work piece it will be noted that when the work piece is made of nonmagnetic material the head can be in the form of a detachable steel band.

Referring now to the base structure 31 of the cradle C it comprises a bottom member 45 having a lower arcuate face 46 which is clamped against the base plate B by screws 47 and clamp plate 48. The leaf spring 32 is clamped between the member 45 and clamp plate by screws 49.

The leaf spring and resilient abutment 34 permit the bar 30, support 33 and rollers 22 to tilt, the tilting taking place in a vertical plane; thus, when the work piece is rotating, unbalance forces will cause the cradle to tilt or rock in accordance with the amount of unbalance. The work piece, of course, will vibrate with the cradle, the vibrations taking place about a center located in the plane P1 as determined by the contact of the work piece and the rollers 25 and 26. In effect, the drive roller 25 and 26 function as a pivot about which the work piece vibrates with the cradle. The amount of unbalance is measured in the plane P2. If the work piece is to be balanced dynamically the same is removed from the rollers and reversed in position.

In addition to the above described magnetic means for holding the work piece axially, the invention contemplates shifting the cradle structure so that the work piece contacts and rotates against a mechanical abutment. This is explained following.

By manipulating the screws 47 (FIGURE 5) the base structure 31 can be oriented with respect to the base by adjusting the same on the arcuate face 46. This will cause the spring 32, bar 30, and rollers 22 to assume a tilted condition. The effect of this is to shift the rotation axis of the work piece so that it is offset as indicated by the dotted lines 44 in FIGURE 5. As shown, the angle is exaggerated for descriptive purposes. With the angled condition the rotation of rollers 25 and 26 has the effect of causing the work piece to move axially so that the right hand end engages the mechanical abutment 42 which defines the limit of axial motion. The work piece remains against the abutment so long as it rotates.

The stop 42 just mentioned is supported by means of a stud 51 from a bracket 52 secured to the pedestal P by a screw 53.

With reference to the drive it is pointed out that the drive roll 25 is driven in a clockwise direction as shown by the arrow in FIGURE 3 and that this imparts counterclockwise rotation to the work piece. Thus the work piece is continuously urged downward to maintain a firm driving connection between the rolls and work piece.

This simple and effective direct drive system is very advantageous in equipment of the character described operating at extremely high revolutions per minute in that no mechanical couplings or universal joints between the cradle and work piece are employed.

Referring now to the modified form of drive illustrated in FIGURES 6 and 7, in this instance the drive spindle 11 is provided with a drive roll 60 and the driven spindle 13 with a driven roll 61 between which an antifriction roll 62 is located for drive by the drive roll 60 and for driving the driven roll 61. This antifriction roll 62 is rotatably mounted on a stud 63 carried by a bracket 64 having a screw and slot connection 65 with the pedestal. The roll 62 is spring loaded by means of a spring 66 to be urged downwardly into firm driving contact with the rolls 60 and 61. The drive spindle 11 has a work piece driving roll 25 secured thereto at its inboard end and the spindle 13 has driven roll 26 secured thereon at its inboard end in the same manner as above described, between which and in driving connection with which the work piece WP' is located.

The work piece WP' in this instance is shown as a heavier work piece for which this drive is particularly adapted because through its greater friction it overcomes the inertia of heavier work pieces.

It is also to be observed that with this form of drive the driving roll 60 can be driven in either direction because in either direction of rotation the spring loaded antifriction roll 62 is urged downwardly into firm driving connection with the driving and driven rolls.

In FIGURES 8, 9 and 10 I have shown a balancing machine wherein magnetic means are used to improve the efficiency of the workpiece drive means. In this embodiment the shaft of a workpiece is supported on a pair of drive rollers and the machine is set up with a permanent or an electro-magnet, the poles of which are in series with the drive rollers and workpiece shaft so that the rollers and shaft become part of the magnetic circuit. The rollers and workpiece shaft become polarized and the attraction and repelling forces have the effect of causing the shaft to be firmly clamped by the rollers. The net result of this is that the workpiece can be brought up to speed in less than one-half the time required without the magnetic arrangement. The details of the arrangement are described below.

Referring to FIGURES 8, 9 and 10 the machine has supporting framework B', a bearing block 70 for the drive spindle 71, a bearing block 72 for the driven spindle 73, a motor driven drive belt 74 for driving the drive spindle 71, a vibrating cradle structure C' such as shown and described in connection with FIGURES 1–5 and a V-shaped permanent magnet 75 spanning the bearing blocks 70 and 72 as seen in FIGURE 10.

The drive spindle 71 has a drive roll 76 secured thereon and the driven spindle 73 has a driven roll 77 secured thereon. An anti-friction roll 78 is located between the rolls 76 and 77, which roll is spring loaded by a spring 79 connected at its lower end to the slider 80 and at its upper end to the fixed bracket 81.

The workpiece "WP," in this instance illustrated in the form of an armature, rests at one end on and is rotated by the rolls 76 and 77 and at its other end is supported on the rolls 22', 22' of the cradle C'.

The legs 82, 82 of the permanent magnet 75 rest on the bearing blocks 70 and 72 and the bearing blocks are secured to a baseplate 83 of non-magnetic material as by means of bolts 84. The non-magnetic baseplate is secured to the framework B' as by means of countersunk non-magnetic screws 85.

I claim:
1. In a balancing machine:
a horizontally extending base;
a horizontally extending cradle bar disposed above said base;
a work piece support mounted on and extending upwardly from said cradle bar;
a pair of rollers mounted on the support for rotation about generally horizontal axes that are substantially parallel to the direction of extension of the base and cradle bar, the rollers being for use in rotatably supporting one portion of a work piece whose unbalance is to be determined;
a resilient abutment mounted on said base and disposed below and adjacent one end of said bar and supporting the bar against downward movement but providing for freedom of tilting movement; and
a horizontally extending leaf spring mounted on said base substantially parallel to the axes of rotation of said rollers and connected to and supporting the other end of said bar; the spring providing for the support to tilt about a generally horizontal axis, the tilting of the bar causing a tilting of said rollers in a vertical plane.
2. In a balancing machine:
a horizontal base;
a horizontally extending cradle bar disposed above said base;
a work piece support mounted on and extending upwardly from said cradle bar;
a pair of rollers mounted on the support for rotation about generally horizontal axis, that are substantially parallel to the direction of extension of the base and cradle bar, the rollers being for use in rotatably supporting one portion of a work piece whose unbalance is to be determined;
a resilient abutment connected to said base and disposed below and adjacent one end of said bar and supporting the bar against downward movement, but providing for freedom of tilting movement;

a horizontally extending leaf spring mounted on said base substantially parallel to the axis of rotation of said rollers and connected to and supporting the other end of said bar, the spring providing for the support to tilt about a generally horizontal axis, the tilting of the bar causing a tilting of said rollers in a vertical plane; and drive means connected with said base, the drive means including a pair of rollers mounted for rotation about fixed, generally horizontal axes, the rollers rotatably supporting another portion of said work piece and at least one of the rollers being driven for imparting rotation to the work piece.

3. A construction according to claim 2 wherein said leaf spring is supported on the base by means providing for the bar, the support and first said rollers to assume a tilted condition and thereby orient the axis of the work piece with respect to the drive rollers whereby the drive rollers when rotating will cause the work piece to move axially and further including an abutment to be engaged by the work piece upon said axial movement and thereby define the limit of such axial motion.

4. In a balancing machine:
a horizontally extending base;
a horizontally extending cradle bar disposed above said base;
a work piece support mounted on and extending upwardly from said cradle bar;
a pair of rollers mounted on the support for rotation about generally horizontal axes that are substantially parallel to the direction of extension of the base and cradle bar, the rollers being for use in rotatably supporting one portion of a work piece whose unbalance is to be determined;
a resilient abutment mounted on said base and disposed below and adjacent one end of said bar and supporting the bar against downward movement, but providing for freedom of tilting movement;
a horizontally extending leaf spring mounted on said base substantially parallel to the axis of rotation of said rollers and connected to and supporting the other end of said bar, the spring providing for the support to tilt about a generally horizontal axis, the tilting of the bar causing a tilting of said rollers in a vertical plane;
an annular band of magnetic material on said work piece circumferentially encompassing it about its rotational axis; and a magnet connected to said base, the poles of which are positioned with respect to said band to induce poles in said magnetic material while the work piece is rotating and thereby provide forces on the band preventing axial movement of the work piece.

5. In a balancing machine:
a cradle rotatably supporting a work piece whose unbalance is to be determined;
means supporting the cradle and providing for the cradle to vibrate due to unbalance in the work piece;
an annular band of magnetic material on said work piece circumferentially encompassing it about its rotational axis; and a magnet to induce poles in said magnetic material while the work piece is rotating and thereby provide forces on the band preventing axial movement of the work piece.

6. In a balancing machine:
a cradle rotatably supporting one portion of a work piece whose unbalance is to be determined;
means supporting the cradle along generally a horizontal axis, substantially parallel with the rotational axis of said work piece and providing for the cradle to vibrate due to unbalance in the work piece;
drive means including a pair of rollers mounted for rotation about fixed axes, the rollers rotatably supporting another portion of said work piece and causing rotation of the work piece and permitting vibration of the work piece with the cradle;
means connected with said cradle and orienting the rotational axis of the work piece with respect to said rollers so that the rollers cause the work piece to move axially; and
a mechanism to be engaged by said work piece and defining the limit of said axial movement.

7. In a balancing machine:
a cradle rotatably supporting one portion of a work piece whose unbalance is to be determined;
means supporting the cradle along generally a horizontal axis, substantially parallel with the rotational axis of said work piece and providing for the cradle to vibrate due to unbalance in the work piece; and
drive means including a pair of rollers mounted for rotation about fixed axes, the rollers rotatably supporting another portion of said work piece and causing rotation of the work piece and providing for the work piece to vibrate with the cradle except those portions of the work piece in contact with the rollers.

8. In a balancing machine:
a cradle having means for rotatably supporting one portion of a work piece whose unbalance is to be determined;
drive means including a pair of rollers mounted for rotation about fixed axes, the rollers rotatably supporting another portion of said work piece and causing rotation of the work piece; and
a magnet, one pole of which is magnetically connected to one roller and the other pole of which is magnetically connected to the other roller, whereby the the rollers and said other portion of the work piece are part of a magnetic circuit including the magnet.

References Cited

UNITED STATES PATENTS 1,365,440  1/1921  Akimoff _____ 73—475

FOREIGN PATENTS 717,529  2/1942  Germany.
163,595  7/1949  Austria.
1,031,543  6/1958  Germany.

JAMES J. GILL, Primary Examiner

ROBERT S. SALZMAN, Assistant Examiner